(12) United States Patent
Ernst et al.

(10) Patent No.: US 8,669,977 B2
(45) Date of Patent: Mar. 11, 2014

(54) HIERARCHICAL MESH QUANTIZATION THAT FACILITATES EFFICIENT RAY TRACING

(75) Inventors: Manfred Ernst, Erlangen (DE); Benjamin Segovia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 12/770,212

(22) Filed: Apr. 29, 2010

(65) Prior Publication Data

US 2011/0080403 A1   Apr. 7, 2011

Related U.S. Application Data

(60) Provisional application No. 61/247,781, filed on Oct. 1, 2009.

(51) Int. Cl.
*G06T 17/00* (2006.01)

(52) U.S. Cl.
USPC ......................................................... 345/420

(58) Field of Classification Search
None
See application file for complete search history.

(56) References Cited

U.S. PATENT DOCUMENTS

| | | | |
|---|---|---|---|
| 6,525,722 B1 * | 2/2003 | Deering | 345/419 |
| 6,718,290 B1 * | 4/2004 | Szymczak et al. | 703/2 |
| 6,825,839 B2 * | 11/2004 | Huang et al. | 345/423 |
| 8,339,395 B2 * | 12/2012 | Gruetzmacher | 345/420 |
| 2003/0160790 A1 | 8/2003 | Tang et al. | |
| 2008/0024489 A1 * | 1/2008 | Shearer | 345/421 |
| 2008/0122838 A1 * | 5/2008 | Hoover et al. | 345/420 |
| 2008/0192050 A1 * | 8/2008 | Schardt et al. | 345/421 |

FOREIGN PATENT DOCUMENTS

| | | |
|---|---|---|
| CN | 101238489 A | 8/2008 |
| FR | 2873472 A1 | 1/2006 |
| JP | 7-192146 A | 7/1995 |
| JP | 10-210468 A | 8/1998 |
| JP | 2002-369205 A | 12/2002 |
| JP | 2008-507056 A | 3/2008 |
| JP | 2009-193095 A | 8/2009 |
| WO | 2008/073798 A2 | 6/2008 |

OTHER PUBLICATIONS

Office Action received for Chinese Patent Application No. 201010500703.2, mailed on Sep. 29, 2012, 9 pages of Office Action including 3 pages of English Translation.
Office Action received for Chinese Patent Application No. 201010500703.2 , mailed on Mar. 18, 2013, 8 Pages of Office Action including 3 pages of English Translation.

(Continued)

*Primary Examiner* — Edward Martello
(74) *Attorney, Agent, or Firm* — Garrett IP, LLC (57) ABSTRACT

Compression methods and systems that encode the bounding volume hierarchy (BVH) and the triangles of a scene in one compact data structure. Efficient on-the-fly decompression is performed and may be used in interactive ray tracing. Quantized vertices and triangle strips may be stored in BVH leaf nodes. The local vertex positions and vertex indices may use a small number of bits that are encoded in bit strings. During traversal, the geometry may be decoded by an optimized algorithm allowing for random access with minimal overhead.

18 Claims, 9 Drawing Sheets

(56) References Cited

OTHER PUBLICATIONS

Kimura, et al., "Constructing a Quad-tree Bounding Volume Hierarchy for Ray Tracing", Technical Report from the Institute of Image Information and Television Engineers, Japan, Mar. 16, 2007, vol. 31, No. 20, 5 Pages. (English Abstract Submitted).

Office Action Received for Japanese Patent Application No. 2010-206819, mailed on Dec. 13, 2011, 2 pages of Office Action and 2 pages of English Translation.

United Kingdom Search Report received for GB Patent application No. 1015347.6, mailed on Jan. 17, 2011, 6 pages.

United Kingdom Examination Report received for GB Patent Application No. 1015347.6, mailed on Jan. 26, 2012, 2 pages.

Office Action Received for Japanese Patent Application No. 2010-206819, mailed on Apr. 3, 2012, 1 page of Office Action and 1 page of English Translation.

Terdiman, Pierre, "Memory-Optimized Bounding-Volume Hierarchies," Mar. 2001, 10 pages.

"Bounding Volume Hierarchy," From Wikipedia, retrieved on Feb. 2, 2011, available at: http://en.wikipedia.org/wiki/Bounding_volume_hierarchy.

Segovia, et al., "Memory Efficient Ray Tracing with Hierarchical Mesh Quantization," Proceedings of Graphics Interface 2010, pp. 153-160.

* cited by examiner

Vertex quantization. Left: unquantized vertices. Center: Local quantization in leaf nodes without global snapping; Gaps appear between adjacent triangles. Right: Local quantization with snapping to a global grid results in a watertight mesh.

HIERARCHICAL MESH QUANTIZATION THAT FACILITATES EFFICIENT RAY TRACING

BACKGROUND

Ray tracing has become increasingly important for both offline rendering and interactive applications. Its flexibility and photo-realistic image quality make ray tracing a preferred algorithm for solving problems such as the global illumination problem. Its suitability for real-time rendering has been demonstrated in recent years. Performance of modern ray tracers is competitive with rasterization for many scenarios and may be more robust and easier to use. With upcoming fully programmable graphics architectures, the remaining advantages of the classic rasterization-based rendering pipelines may diminish.

One issue with ray tracing is, however, that optimal performance can only be achieved when the entire scene fits into device memory. Most interactive ray tracing implementations make generous use of memory because this approach yields high frame rates. This is a problem for practical applications, no more so than on graphics boards with fast but limited memory.

The reluctance to use data compaction for fast ray tracing is attributable to the performance impact of most compression algorithms and the lack of support for random access. Sequential decompression of the entire data set before rendering may not be an option. Recently developed algorithms make a step in the right direction, but they either achieve only moderate compression rates or they require blockwise decompression of the data structures with caching. Both limitations are problematic for real-time ray tracing of very large models on devices with limited memory.

DETAILED DESCRIPTION

A preferred embodiment is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The methods and systems described herein may store a triangle mesh and its bounding volume hierarchy (BVH) in compact hierarchical data structure. The BVH may be used as an acceleration structure and as a hierarchical compressed representation of triangle meshes. This exploits the fact that a BVH can represent an approximation of the triangle mesh. The vertices of the mesh may be stored as quantized values inside the BVH leaves with a small number of bits.

Quantization of the vertex positions inside the leaf nodes, however, may result in gaps between adjacent triangles, if they are located in different leaves. This happens because the quantization positions inside two leaf nodes may not be aligned. In an embodiment, this problem may be solved with a global quantization grid, where all leaf nodes may be aligned on this grid. The triangle vertices may be snapped to the same grid and their position may be stored as an integer offset to the origin of their respective bounding box. The integer positions inside one leaf node may typically have a small range and may be amenable for compression.

The integer values could be encoded with an aggressive compression algorithm like Huffman coding or arithmetic coding, for example. In an embodiment, the data may be stored in bit-strings. An optimized unpacking function may be used to decode them at low cost.

In addition to the vertex positions, the vertex connectivity may be compressed. The triangles may be stored locally inside the BVH nodes as strips or indexed strips, whichever is smaller. As is the case with quantized positions, the vertex indices may have a small range and can be compressed.

The bounding volume hierarchy itself may also be stored in a compact format. The BVH nodes may be quantized. In addition, the nodes may be stored in clusters. In this way, the child pointers may represent a local offset in the cluster that may require only a small number of bits. Overall, the size of a BVH node may be reduced from 32 bytes to 4 bytes, for example. Generally, there are no restrictions on BVH construction algorithm, so that a conventional builder may be used.

Figure 1:
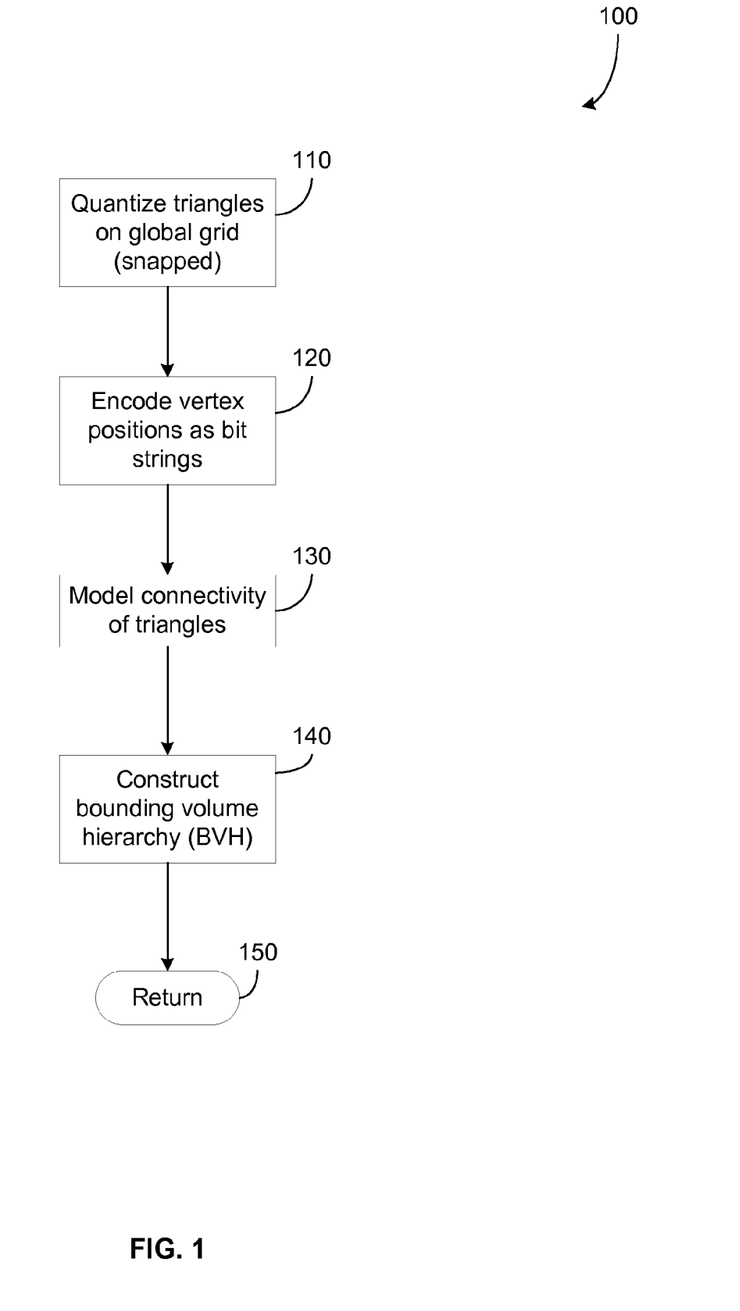
FIG. 1 is a flowchart illustrating the overall processing described herein, according to an embodiment.

Overall processing is illustrated in FIG. 1, according to an embodiment. At 110, the triangles of a model may be quantized on a global grid and snapped. This may be done in a manner that eliminates gaps that may otherwise appear if the triangles were quantized on respective local grids. At 120, the positions of the vertices of the triangles are encoded as bits strings. This is performed in a manner that minimizes the number of bits required to represent the vertices. At 130, the connectivity of the triangles is modeled. In an embodiment, this may be performed by considering the triangles in strips, as will be described in greater detail below. At 140, some or all of the model may be represented in a BVH. In an embodiment, the BVH may be constructed in a compact manner, to be described in greater detail below. The process may conclude at 150.

Quantizing on a Global Grid

Figure 2:
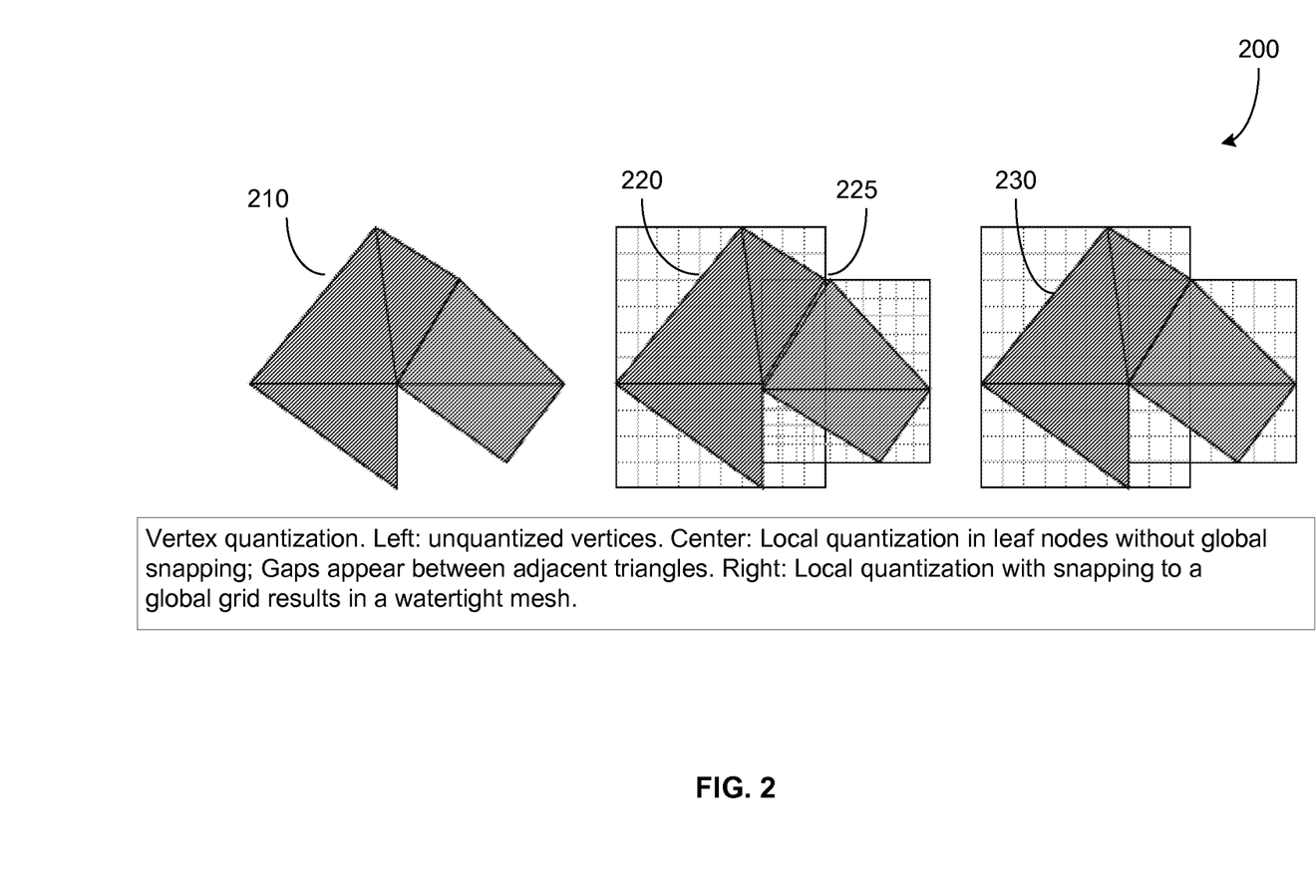
FIG. 2 shows the placement of triangles on a global grid, according to an embodiment

The positioning of triangles on a global grid is illustrated in FIG. 2, according to an embodiment. When modeling a shape as a set of triangles in the context of a bounding volume hierarchy, cracks or gaps in the geometry may appear when placing individual polygons on locally quantized grids. This may be prevented by snapping all triangle vertices and leaf bounding boxes to the same global grid. The leftmost illustration 210 shows a set of adjoining triangles where the vertices remain unquantized and without placement on a grid. Center illustration 220 shows triangles each placed and quantized on their own local grid. Merging the triangles may lead to gaps between triangles that are meant to be joined. These gaps, such as gap 225, may represent artifacts of local quantization. In an embodiment, a global grid can be used, where triangles may be snapped such that gaps are eliminated. This is shown at the rightmost illustration 230. Here, gap 225 may be eliminated. Note that in the context of a BVH, the globally snapped bounding boxes need not be stored, because they can be snapped on the fly for decompression of the vertices.

Encoding Vertex Positions

To save additional memory, bit strings may be used to specify triangle vertices. In an embodiment, the vertex positions may be encoded relative to a bounding box origin O. Therefore, given a set of vertices ($A_i$) to encode, the delta vectors ($D_i = \{x_i, y_i, z_i\}$) may first be computed from O to each respective vertex in $A_i$. Then the number of bits ($n_x$, $n_y$, $n_z$) required to respectively encode max($x_i$), max($y_i$), max($z_i$) may be computed. ($n_x$, $n_y$, $n_z$) provides the total number of bits n required, at most, for each coordinate of each vertex and may lead to a variable bit encoding scheme. In an embodiment, the numbers ($n_x$, $n_y$, $n_z$) of bits required for each vertex are encoded in the bit sting. The vertex data may be enqueued afterward.

Figure 3:
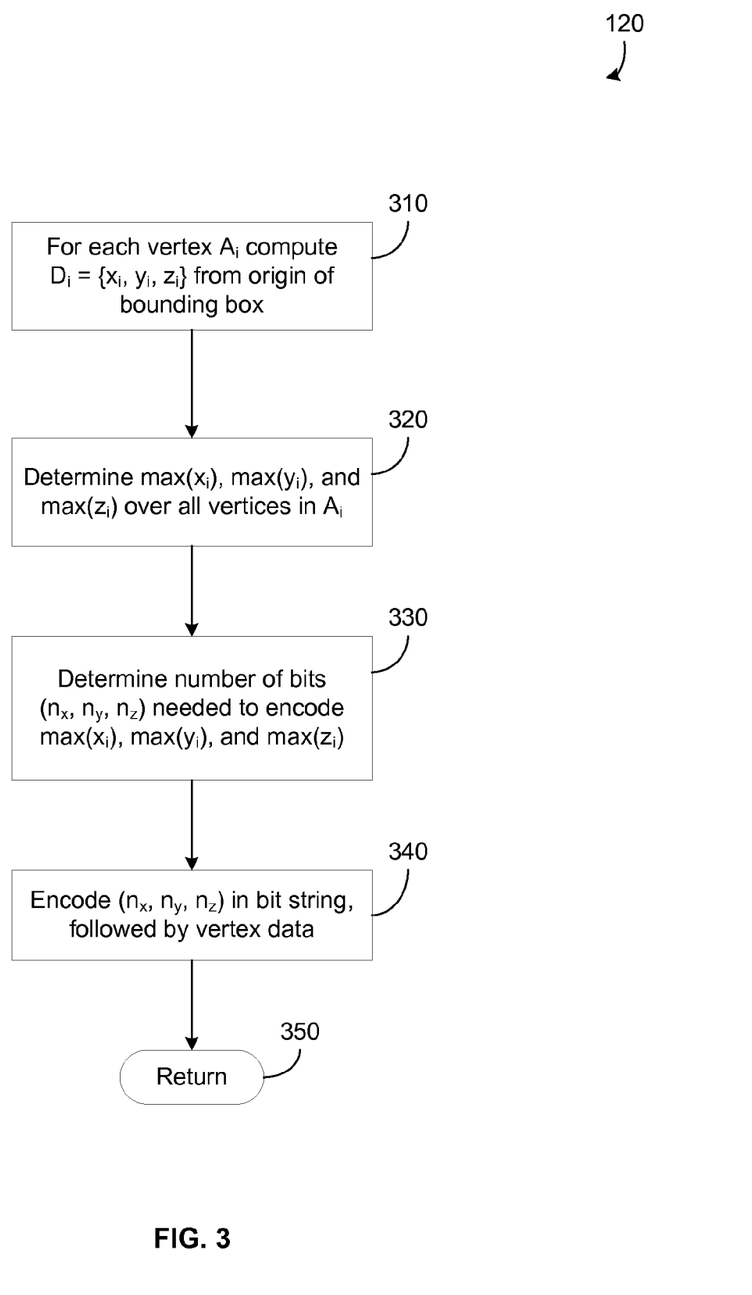
FIG. 3 is a flowchart illustrating the encoding of vertex positions as bit strings, according to an embodiment.

The encoding of vertices is illustrated in FIG. 3, according to an embodiment. At 310, for each vertex a delta vector $D_i = \{x_i, y_i, z_i\}$ may be computed, where each component of this vector describes the distance, in that dimension, from the origin of the bounding box to the vertex. At 320, the largest values for each dimension may be determined, over all of the vertices $A_i$. These maximal values are shown as max($x_i$), max($y_i$), and max($z_i$). At 330, the number of bits needed to encode each of these maximal values may be determined. This results in three values, ($n_x$, $n_y$, $n_z$) representing these maximal values. At 340, these values ($n_x$, $n_y$, $n_z$) may be placed in a bit string, followed by the vertex data for $A_i$. The process may conclude at 350.

One technique to encode the vertex data inside a bounding box may consist in computing the integer delta vector from the origin. However, the leaf bounding boxes are the actual bounding boxes of the vertices they contain. Since some vertices are located on or near one of the bounding box faces, computing the delta values from the closest plane (instead of from the origin) may lead to smaller delta vectors that could be represented with fewer bits.

For this reason, in an embodiment, one extra bit may be added for each component of the delta vector to identify the closest plane from which the distance is measured. This may reduce the final size (i.e., number of bits) of the vertex data. This may be particularly useful for models which contain many big triangles. In the 2-dimensional example of FIG. 4, a delta vector may be created for each vertex, including vertex D. Here, for any given vertex, $x_{min}$ may be used to designate the distance from the vertex to the origin O (labeled as 405) in the x direction. The variable $y_{min}$ may be used to designate the distance from the origin 405 to D in the y direction. For the vertex D, the closest "plane" in the y dimension would correspond to the upper boundary 410; the closest "plane" in the x dimension would correspond to the rightmost boundary 420. Vertex D would therefore be encoded as ($x_{max}^D$, $y_{max}^D$), where these coordinates represent the distances from the upper boundary 410 and from the rightmost boundary 420 respectively. An extra bit may then be added for each coordinate, to identify the closest boundary. In the case of the first coordinate, its extra bit would signify either the upper or lower boundary; in the case of the second coordinate, its extra bit would signify either the right or the left boundary.

Decoding the vertex data may consist in reading the number of bits required for each component and decoding the vertex data.

Figure 4:
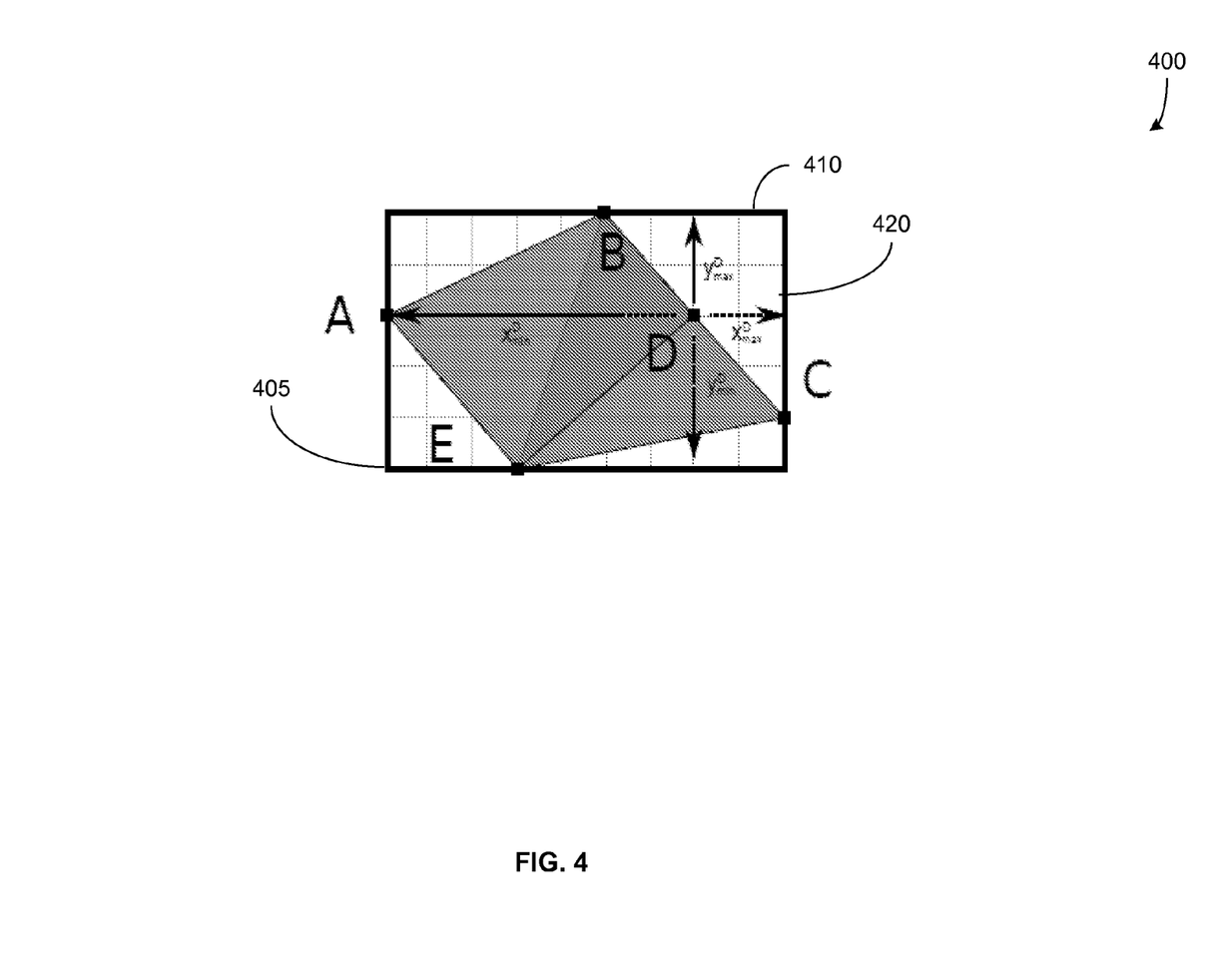
FIG. 4 illustrates the encoding of vertices, where the closest bounding plane may be indicated by an extra bit, according to one embodiment.

It is to be understood that FIG. 4 illustrates a 2-dimensional model, for the sake of simplicity and the ease of illustration. This example could be extended to a 3-dimensional case, where the boundaries would be planes, rather than line segments. In addition to the x and y coordinates, a z coordinate would also be present to encode any given vertex.

Triangle Connectivity

Triangle connectivity may also be modeled. There are several ways to achieve this. In one method, three vertex positions may be stored per triangle, duplicating shared vertices. Given the leaf example provided in FIG. 4, the vertex position sequence {ABE,EBD,CED} may be directly encoded. Another possibility is to store an array of vertex positions and then store three indices per triangle, where the indices may refer to the vertex positions identified in the array. In the case of FIG. 4, {ABCDE} may be stored for the vertex data. Indices may be defined, e.g. 0 for the first identified vertex (A), 1 for the second identified vertex (B), etc. As a result {[0,1,4], [4,1,3], [2,4,3]} may be used to name the triangles. [0,1,4] represents the triangle ABE, for example.

Another way to model triangle connectivity is to view contiguous triangles as strips. Using strips or indexed strips may provide the opportunity to reduce leaf sizes and decoding times. A strip system for a triangle mesh contained in a leaf is used in an embodiment. Such a system may handle triangle mesh layouts in leaves, e.g., a strip of four triangles followed a strip of three triangles followed by one triangle. This approach may use a look-up table (LUT) that may be generated automatically and may be designed as follows:

- limit the maximum number of triangles per leaf (for example, 14);
- each entry of the LUT handles one mesh layout. Entry STRIP3X3_STRIP2X3_TRIX4 will for example handle a layout consisting of three strips of three triangles, then three strips of two triangles, and then four triangles;
- to limit the number of entries, sort the strips according to their sizes. Therefore, STRIP4X1_STRIP3X3 would be a valid entry while STRIP3X3_STRIP4X1 would not;
- for each entry, store the number of triangles and the offsets of their first vertex. For example, Entry STRIP3X1_TRIX2 is composed by five triangles and the five triangle offsets, {0,1,2,5,8};
- strips alternate clockwise and counter-clockwise triangles; store each triangle's orientation.

The LUT may be independent of the use of strips or indexed strips. If the leaf stores triangle strips, the offsets provided by the table may give the offset of the vertex positions. Conversely, if the leaf stores indexed strips, the table may provide the offset of the vertex indices. During compression, both strips and indexed strips may be computed, and only the smaller representation may be kept. The leaves may then be flagged with an additional bit to indicate the presence of strips or indexed strips.

Figure 5:
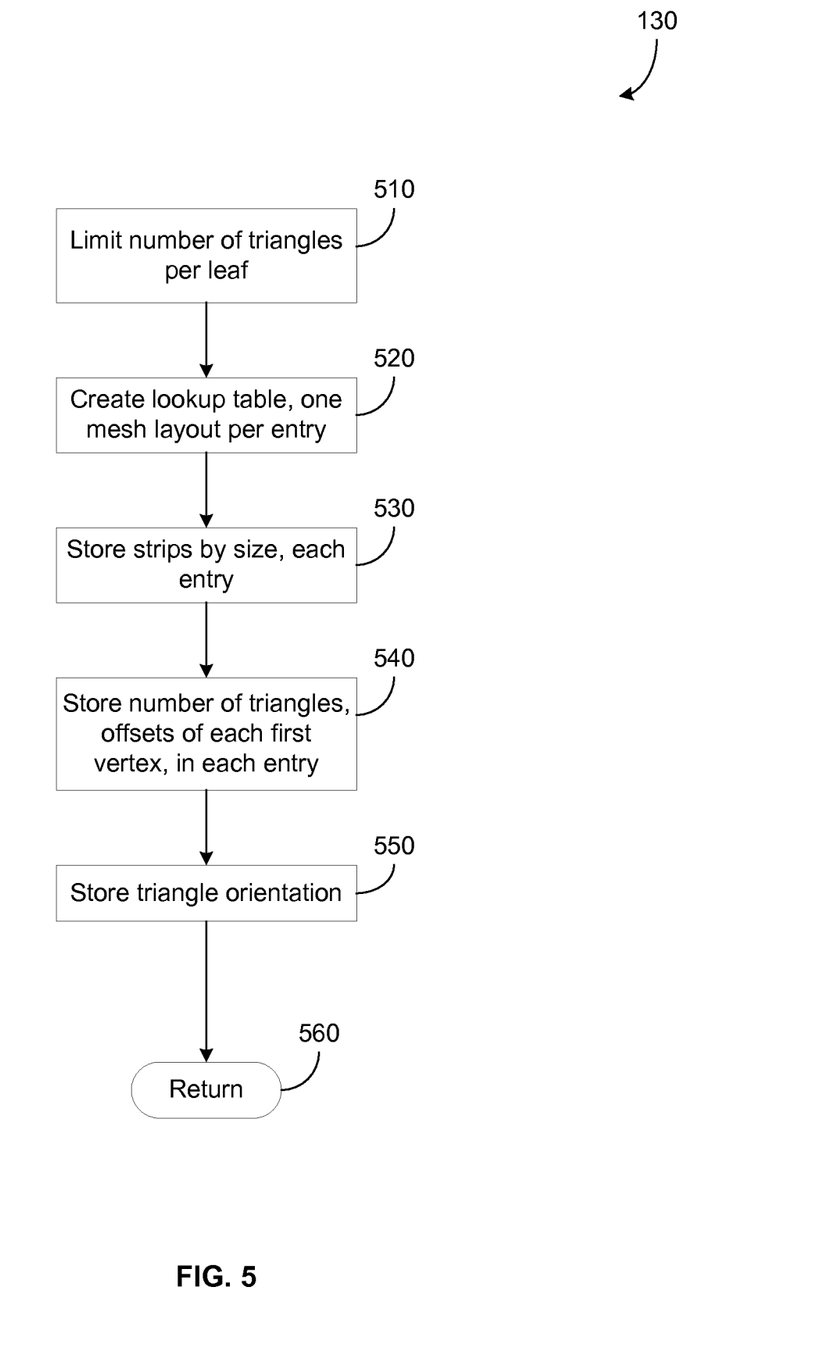
FIG. 5 is a flowchart illustrating the use of a lookup table to model the connectivity of triangles, according to an embodiment.

Processing related to the use of strips for modeling of triangle connectivity is illustrated in FIG. 5, according to an embodiment. At 510, a number may be chosen representing a limit to the number of triangles that may be contained in a single leaf. At 520, a lookup table may be created, wherein each entry corresponds to a single mesh layout. At 530, strips may be stored in each entry, organized by size. At 540, the number of triangles and the offsets of each first vertex may be stored at each entry. At 550, the triangle orientations may be stored. The process may conclude at 560.

Decoding

To speed up the decoding step in certain architectures, unaligned load capabilities of a target architecture may be used in an embodiment. One example of such an architecture is the x86 architecture. Chips such as those in the x86 family can be particularly lenient regarding memory loads. Here, 64-bit quad-words may be loaded regardless of their alignment in the following manner:

For a number of bits n needed to represent each vertex, compute the maximum number $p_n = \lceil 64/n \rceil$ of vertices that fit into a quad-word.

Store vertices using unaligned sequences of $p_n$ vertices.

Figure 6:
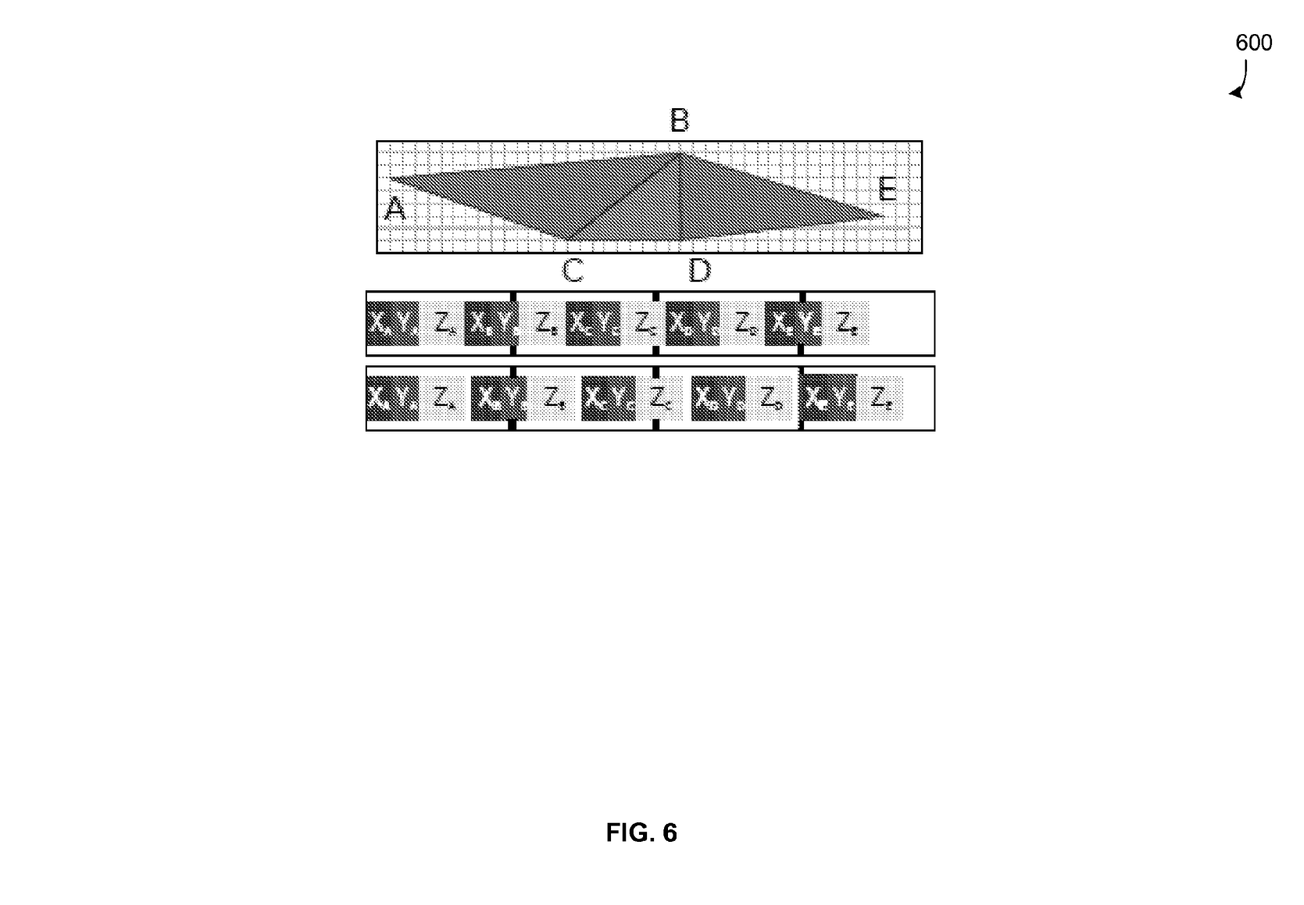
FIG. 6 illustrates the use of unaligned loads for vertex decoding, according to an embodiment.

The last step is illustrated in the embodiment of FIG. 6: here n is equal to 44 bits and $p_n$ is equal to 1. One 44-bit vertex may be encoded, and four bits may be left blank to finish on a byte boundary. A total of 48 bits is therefore allocated to the vertex. The next vertex may be encoded six bytes (48 bits=(8 bits per byte)*(6 bytes)) after the start of the previous one.

Since every sequence of $p_n$ vertices starts now on a new byte, the decoding step is improved where the underlying architecture supports fast unaligned loads. For fast decoding, a look-up table (LUT) may first be computed, where the LUT stores two values for every vertex size $n \in [1 \ldots 64]$: the number of vertices $p_n$ that may be stored inside a quad-word, and the offset $s_n$ in bytes relative to the location of the next vertex (or vertices) to decode.

The decoding step may proceed as follows, where q is the quad-word from where decoding is currently taking place:

1. decode $p_n$ vertices from q. As all vertices fit into q, this operation may require a sequence of SHIFT and AND instructions;
2. load the next quad-word located $s_n$ bytes after q.

To improve the decoding step, integer SIMD operations may be used. Once the delta values from the bit string are obtained, a branch-less code using SIMD operations may retrieve the integer snapped positions and then compute the world space floating point locations using the origin and the cell size of the snapping grid, according to an embodiment. An example of pseudo-code of the vertex data decoding is given in Appendix A.

BVH Tree Layout

Figure 7:
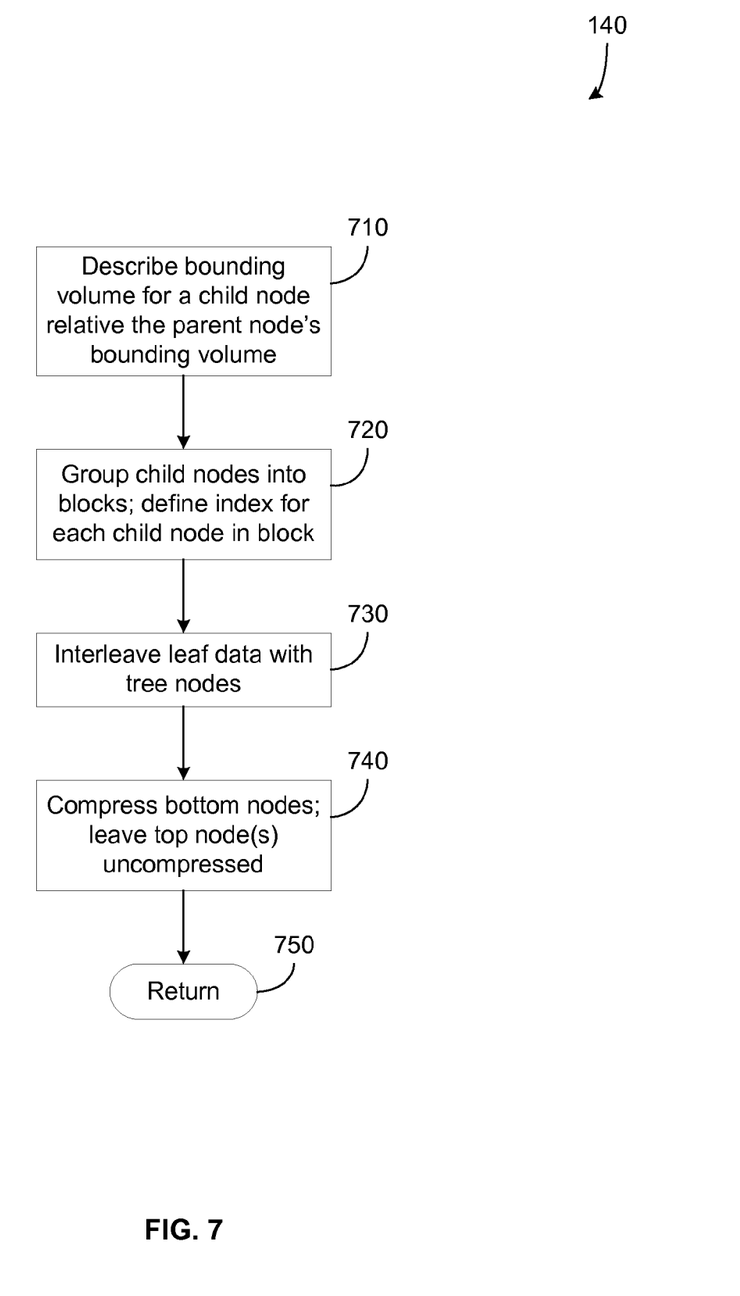
FIG. 7 is a flowchart illustrating the construction of a compact bounding value hierarchy, according to an embodiment.

The following describes a two-level BVH which may use both compressed and uncompressed nodes; hierarchical quantization that may reduce bounding box memory consumption; and block allocation and block-relative indices that may reduce the size of references to child nodes. The processing is illustrated in FIG. 7, according to an embodiment. At 710, hierarchical encoding may be used to express the position of child bounding boxes, i.e., child nodes. The minimum and maximum positions of the child bounding boxes may be expressed relative to their parent nodes. Offsets may be used to define the locations of corners of a child bounding box, where the offsets are relative to a point (such as an origin) of the parental box. If only four bits may be used to encode each child bounding box component, the bounding box memory footprint is equal to 24 bits. In an embodiment, using four bytes (32 bits) per node therefore allows eight bits to index the child nodes and to encode extra information as described in the next section.

Figure 8:
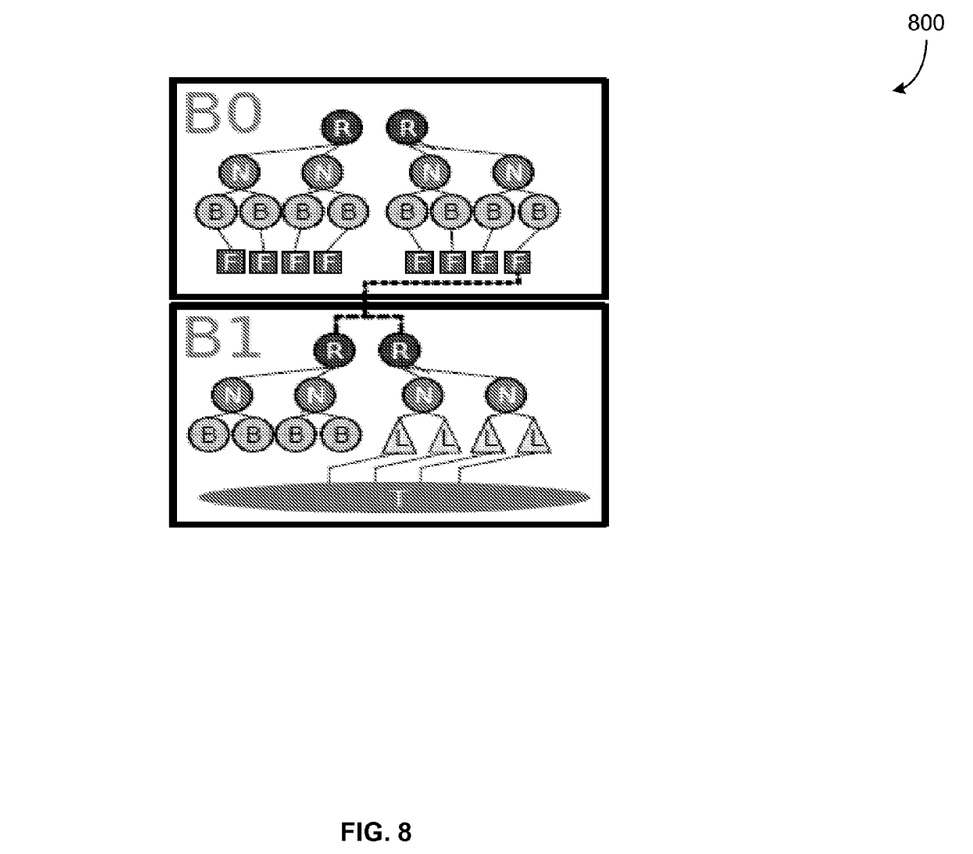
FIG. 8 illustrates the layout of a bounding value hierarchy, where child nodes may be organized into blocks, according to one embodiment.

At 720, child nodes may be grouped into blocks. As shown in the embodiment of FIG. 8, two indexing systems may be used. Inside a block, a small number of bits may be used to index the children. In FIG. 8, small indices may be used, for example, to index nodes N from root nodes R. To refer a child outside the current block, a four byte integer may be stored in a dedicated forward node. In the illustration, forward nodes F may be pointed to, by bottom nodes B. Forward nodes F themselves may point to block roots R, where these roots R are roots of respective subtrees.

Using this layout, a four byte node format may be built such that:

24 bits may be used for the bounding box (see Appendix B).

6 bits may be used to index the child nodes.

2 bits may be used to distinguish leaf nodes and the three internal node types X, Y, Z that may be required to sort the two children.

At 730, leaf data may be interleaved with tree nodes. When indexing the leaf data (like triangle indices or vertex positions), using one or more four-byte indices may be expensive. As shown in the embodiment of FIG. 8, interleaving leaf data and tree nodes may avoid references to external arrays. By enqueuing the leaf data after each block, the leaf data may be indicated relative to the leaf location in memory.

At 740, bottom nodes in the BVH may be compressed, leaving at least a portion of the top nodes uncompressed. As top nodes are traversed by most of the rays, this may limit the performance impact while maintaining a small memory footprint.

The process may conclude at 750.

Implementation

The processing described above may be implemented in hardware, firmware, or software, or some combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. A computer program product may comprise, for example, a compact disk, flash memory, or a read-only memory (ROM) or other non-volatile memory device.

A software or firmware embodiment of the processing described above is illustrated in FIG. 9. System 900 may include a processor 920 and a body of memory 910 that may include one or more computer readable media that may store computer program logic 940. Memory 910 may be implemented as a hard disk and drive, a removable media such as a compact disk and drive, or a ROM device, for example. Processor 920 and memory 910 may be in communication using any of several technologies known to one of ordinary skill in the art, such as a bus. Logic contained in memory 910 may be read and executed by processor 920. One or more I/O ports and/or I/O devices, shown collectively as I/O 930, may also be connected to processor 920 and memory 910.

Figure 9:
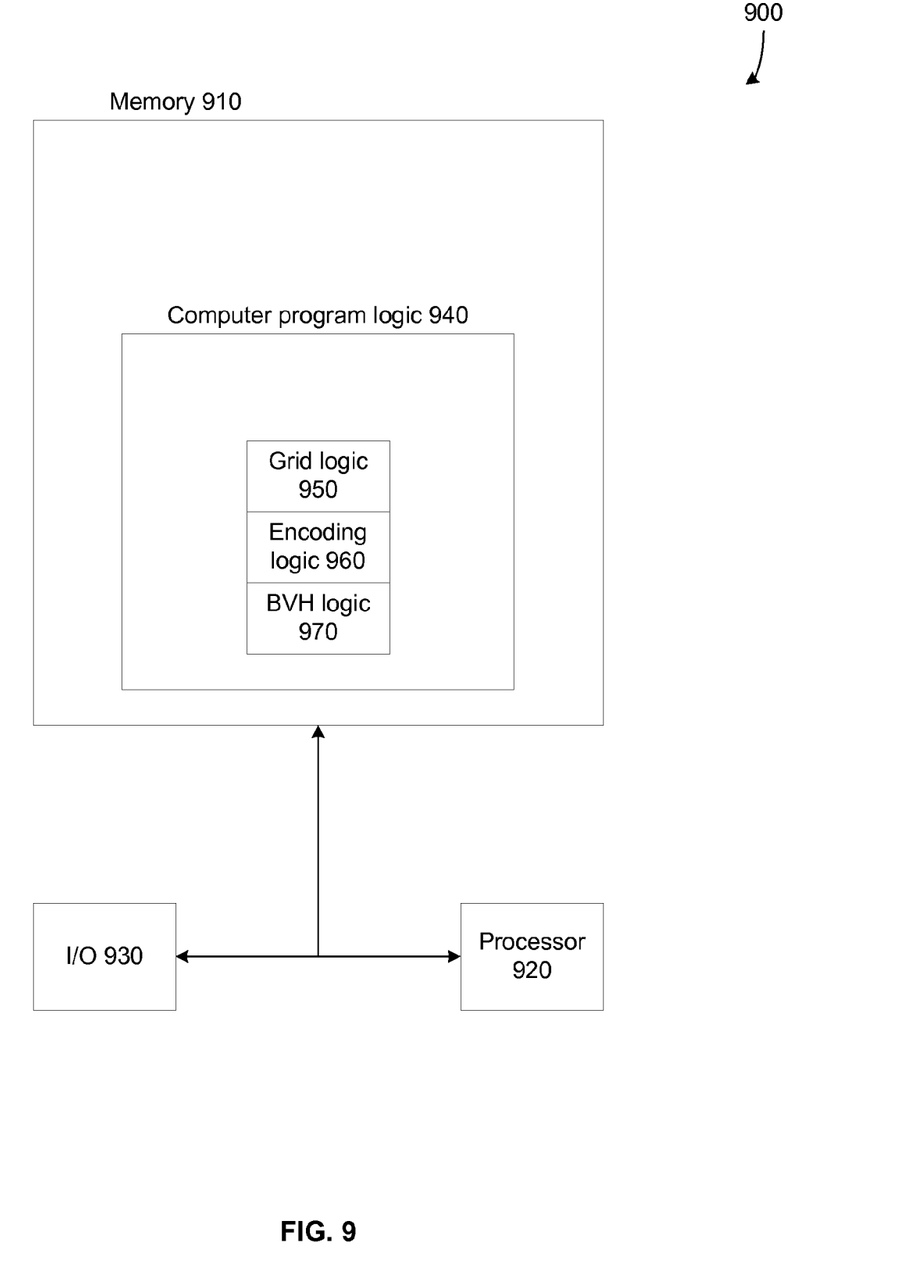
FIG. 9 illustrates a software or firmware implementation of the processing described herein, according to an embodiment.

Computer program logic may include modules 950-970, according to an embodiment. Grid logic 950 may be responsible for quantization of triangles on a global grid, such that the triangles are snapped. Encoded logic 960 may be responsible for encoding the vertex positions as bit strings and four encoding triangle connectivity, as described above. BVH logic 970 may be responsible for construction of a BVH and a compact fashion as described above.

Methods and systems are disclosed herein with the aid of functional building blocks that illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

APPENDIX A

Fast Vertex Data Decoding

```
// Compressed AABB in 3 bytes. 4 bits are used for each component
struct CAABB {
    void decode (aos3f pMin, aos3f pMax,
                aos3f &tMin, aos3f &tMax) const;
    // Store per component the min/max value
    uint8_t pMinMax [3];
    // Make the conversion from the 8 bit min/max to floats
    static const float dLUTMinMax [256] [2];
};
// Fast gather using SSE4.1 instructions
FINLINE aos3f
aos3f: :gather (const float *x, const float *y, const float *z) {
    aos3f to;
    to.vec = _mm_load_ss (x);
    to.vec = _mm_castsi128_ps (_mm_insert_epi32 (
        _mm_castps_si128 (to.vec), * ( (int *) y), 1) ) ;
    to.vec = _mm_castsi128_ps (_mm_insert_epi32 (
        _mm _castps_si128 (to.vec), * ( (int *) z), 2) ) ;
    return to;
}
// Fast decompression using SSE hand-coded gather
FINLINE void
CAABB4: :decode (aos3f pMin, pMax, aos3f &tMin, aos3f &tMax) const
{
    const aos3f ext = pMax − pMin;
    const float *x = dLUTMinMax [this->pMinMax [0] ] ;
    const float *y = dLUTMinMax [this->pMinMax [1] ] ;
    const float *z = dLUTMinMax [this->pMinMax [2] ] ;
    const aos3f deltaMin = aos3f: :gather (x, y, z);
    const aos3f deltaMax = aos3f: :gather (x + 1, y + 1, z + 1) ;
    const aos3f tmpMin = pMin + ext * deltaMin;
    const aos3f tmpMax = pMin + ext * deltaMax;
    tMin = tmpMin;
    tMax = tmpMax;
}
```

APPENDIX B

Fast Compressed Node Decoding

```
// Compressed AABB in 3 bytes. 4 bits are used for each component
struct CAABB {
    void decode (aos3f pMin, aos3f pMax,
                aos3f &tMin, aos3f &tMax) const;
    // Store per component the min/max value
    uint8_t pMinMax [3];
    // Make the conversion from the 8 bit min/max to floats
    static const float dLUTMinMax [256] [2];
};
// Fast gather using SSE4.1 instructions
FINLINE aos3f
aos3f: :gather (const float *x, const float *y, const float *z) {
    aos3f to;
    to.vec = _mm_load_ss (x);
    to.vec = _mm_castsi128_ps (_mm_insert_epi32 (
        _mm_castps_si128 (to.vec), * ( (int *) y), 1) ) ;
    to.vec = _mm_castsi128_ps (_mm_insert_epi32 (
        _mm_castps_si128 (to.vec), * ( (int *) z), 2) ) ;
    return to;
}
// Fast decompression using SSE hand-coded gather
FINLINE void
CAABB4: :decode (aos3f pMin, pMax, aos3f &tMin, aos3f &tMax) const
{
    const aos3f ext = pMax − pMin;
    const float *x = dLUTMinMax [this->pMinMax [0] ] ;
    const float *y = dLUTMinMax [this->pMinMax [1] ] ;
    const float *z = dLUTMinMax [this->pMinMax [2] ] ;
    const aos3f deltaMin = aos3f: :gather (x, y, z);
    const aos3f deltaMax = aos3f: :gather (x + 1, y + 1, z + 1) ;
    const aos3f tmpMin = pMin + ext * deltaMin;
    const aos3f tmpMax = pMin + ext * deltaMax;
    tMin = tmpMin;
    tMax = tmpMax;
}
```

What is claimed is:

1. A method, comprising:
   quantizing triangles of a scene on a global grid, such that adjoining triangles are snapped together;
   encoding the vertex positions of the triangles as variable length bit strings;
   modeling the connectivity of the triangles; and
   constructing a compact bounding volume hierarchy (BVH) that represents at least a portion of the scene,
   wherein the method is performed by a processor configured to perform graphics processing,
   wherein said encoding of vertex positions comprises:
   for each of vertex, computing a delta vector $D_i=\{x_i, y_i, z_i\}$, where each component of $D_i$ indicates the distance of the vertex, along the dimension of the component, from the closest plane of the bounding box that includes the vertex, where the closest plane is perpendicular to the dimension and is either the plane containing the origin or the plane opposite to the plane containing the origin;
   over all vertices in the bounding box, determining the largest x, y, and z components from among the delta vectors of the respective vertices, max $(x_i)$, max $(y_i)$, max $(z_i)$;
   determining the number of bits $(n_x, n_y, n_z)$ needed to encode max $(x_i)$, max $(y_i)$, and max $(z_i)$ respectively;
   encoding $(n_x, n_y, n_z)$, wherein the encoded $(n_x, n_y, n_z)$ are followed by the delta vectors of the vertices; and
   adding an extra bit to each of $x_i$, $y_i$, $z_i$, wherein the extra bit identifies the closest plane.

2. The method of claim 1, wherein said modeling of connectivity comprises identifying each vertex of each triangle, wherein when a vertex of the triangles is a vertex for a plurality of triangles, the vertex is identified separately for each triangle of the plurality.

3. The method of claim 1, wherein said modeling of connectivity comprises:
   identifying each vertex once;
   associating an index with each respective vertex; and
   identifying each triangle by listing the three indices associated with the three respective vertices of the triangle.

4. The method of claim 1, wherein said modeling of connectivity comprises:
specifying a maximum number of triangles per leaf in the BVH;
constructing a lookup table (LUT), where each entry of the LUT is associated with a set of strips, where each strip comprises a sequence of one or more contiguous triangles where no triangle is represented more than once in the LUT;
for each entry, storing the number of triangles and the offsets of the first vertex of each triangle; and
storing the orientation of each triangle.

5. The method of claim 1, wherein said constructing of a compact BVH comprises:
for each child node, defining a bounding volume that is specified relative to an associated parent node's bounding volume;
grouping child nodes into blocks;
for each block, defining an index for each child node in the block;
for each block with leaves, listing leaf data associated with the block after the block; and
storing bottom nodes in a compressed format and storing at least a portion of the top nodes in an uncompressed format.

6. The method of claim 5, wherein a child node in the block is mapped to a forwarding node, such that a forwarding node points to a subordinate subtree of the child node where the subtree resides in a separate block.

7. A system, comprising:
a processor; and
a memory in communication with said processor, said memory for storing a plurality of processing instructions for directing said processor to:
quantize triangles of a scene on a global grid, such that adjoining triangles are snapped together;
encode the vertex positions of the triangles as variable length bit strings;
model the connectivity of the triangles; and
construct a compact bounding volume hierarchy (BVH) that represents at least a portion of the scene,
wherein said instructions for directing said processor to encode vertex positions comprise instructions for directing said processor to:
for each of vertex, compute a delta vector Di={xi, yi, zi}, where each component of Di indicates the distance of the vertex, along the dimension of the component, from the closest plane of the bounding box that includes the vertex, where the closest plane is perpendicular to the dimension and is either the plane containing the origin or the plane opposite to the plane containing the origin;
over all vertices in the bounding box, determine the largest x, y, and z components from among the delta vectors of the respective vertices, max (xi), max (vi), max (zi);
determine the number of bits (nx, ny, nz) needed to encode max (xi), max (yi), and max (zi) respectively;
encode (nx, ny, nz), wherein the encoded (nx, ny, nz) are followed by the delta vectors of the vertices; and
add an extra bit to each of xi, yi, zi, wherein the extra bit identifies the closest plane.

8. The system of claim 7, wherein said instructions for directing said processor to model connectivity comprise instructions for directing said processor to:
identify each vertex of each triangle, wherein when a vertex of the triangles is a vertex for a plurality of triangles, the vertex is identified separately for each triangle of the plurality.

9. The system of claim 7, wherein said instructions for directing said processor to model connectivity comprise instructions for directing said processor to:
identify each vertex once;
associate an index with each respective vertex; and
identify each triangle by listing the three indices associated with the three respective vertices of the triangle.

10. The system of claim 7, wherein said instructions for directing said processor to model connectivity comprise instructions for directing said processor to:
specify a maximum number of triangles per leaf in the BVH;
construct a lookup table (LUT), where each entry of the LUT is associated with a set of strips, where each strip comprises a sequence of one or more contiguous triangles where no triangle is represented more than once in the LUT;
for each entry, store the number of triangles and the offsets of the first vertex of each triangle; and
store the orientation of each triangle.

11. The system of claim 7, wherein said instructions for directing said processor to construct of a compact BVH comprises instructions for directing said processor to:
for each child node, define a bounding volume that is specified relative to an associated parent node's bounding volume;
group child nodes into blocks;
for each block, define an index for each child node in the block;
for each block with leaves, list leaf data associated with the block after the block; and
store bottom nodes in a compressed format and store at least a portion of the top nodes in an uncompressed format.

12. The system of claim 11, wherein a child node in the block is mapped to a forwarding node, such that a forwarding node points to a subordinate subtree of the child node where the subtree resides in a separate block.

13. A computer program product including a non-transitory computer readable medium having computer program logic stored therein, the computer program logic embodied in computer executable instructions to cause a processor to:
quantize triangles of a scene on a global grid, such that adjoining triangles are snapped together;
encode the vertex positions of the triangles as variable length bit strings;
model the connectivity of the triangles; and
construct a compact bounding volume hierarchy (BVH) that represents at least a portion of the scene,
wherein said encoding of vertex positions comprises:
for each of vertex, computing a delta vector $D_i=\{x_i, y_i, z_i\}$, where each component of $D_i$ indicates the distance of the vertex, along the dimension of the component, from the closest plane of the bounding box that includes the vertex, where the closest plane is perpendicular to the dimension and is either the plane containing the origin or the plane opposite to the plane containing the origin;
over all vertices in the bounding box, determining the largest x, y, and z components from among the delta vectors of the respective vertices, max ($x_i$), max ($y_i$), max ($z_i$);
determining the number of bits ($n_x$, $n_y$, $n_z$) needed to encode max ($x_i$), max ($y_i$), and max ($z_i$) respectively;
encoding ($n_x$, $n_y$, $n_z$), wherein the encoded ($n_x$, $n_y$, $n_z$) are followed by the delta vectors of the vertices; and
adding an extra bit to each of $x_i$, $y_i$, $z_i$, wherein the extra bit identifies the closest plane.

14. The computer program product of claim 13, wherein the logic to cause the processor to model connectivity comprises:
    logic to cause the processor to identify each vertex of each triangle, wherein when a vertex of the triangles is a vertex for a plurality of triangles, the vertex is identified separately for each triangle of the plurality.

15. The computer program product of claim 13, wherein the logic to cause the processor to model connectivity comprises:
    logic to cause the processor to identify each vertex once;
    logic to cause the processor to associate an index with each respective vertex; and
    logic to cause the processor to identify each triangle by listing the three indices associated with the three respective vertices of the triangle.

16. The computer program product of claim 13, wherein the logic to cause the processor to model connectivity comprises:
    logic to cause the processor to specify a maximum number of triangles per leaf in the BVH;
    logic to cause the processor to construct a lookup table (LUT), where each entry of the LUT is associated with a set of strips, where each strip comprises a sequence of one or more contiguous triangles where no triangle is represented more than once in the LUT;
    logic to cause the processor to, for each entry, store the number of triangles and the offsets of the first vertex of each triangle; and
    logic to cause the processor to store the orientation of each triangle.

17. The computer program product of claim 13, wherein the logic to cause the processor to construct a compact BVH comprises:
    logic to cause the processor to, for each child node, define a bounding volume that is specified relative to an associated parent node's bounding volume;
    logic to cause the processor to group child nodes into blocks;
    logic to cause the processor to, for each block, define an index for each child node in the block;
    logic to cause the processor to, for each block with leaves, list leaf data associated with the block after the block; and
    logic to cause the processor to store bottom nodes in a compressed format and store at least a portion of the top nodes in an uncompressed format.

18. The computer program product of claim 17, wherein a child node in the block is mapped to a forwarding node, such that a forwarding node points to a subordinate subtree of the child node where the subtree resides in a separate block.

* * * * *